No. 894,439. PATENTED JULY 28, 1908.
A. HOVLAND.
TRAVELING THRESHER.
APPLICATION FILED FEB. 25, 1907.
5 SHEETS—SHEET 1.
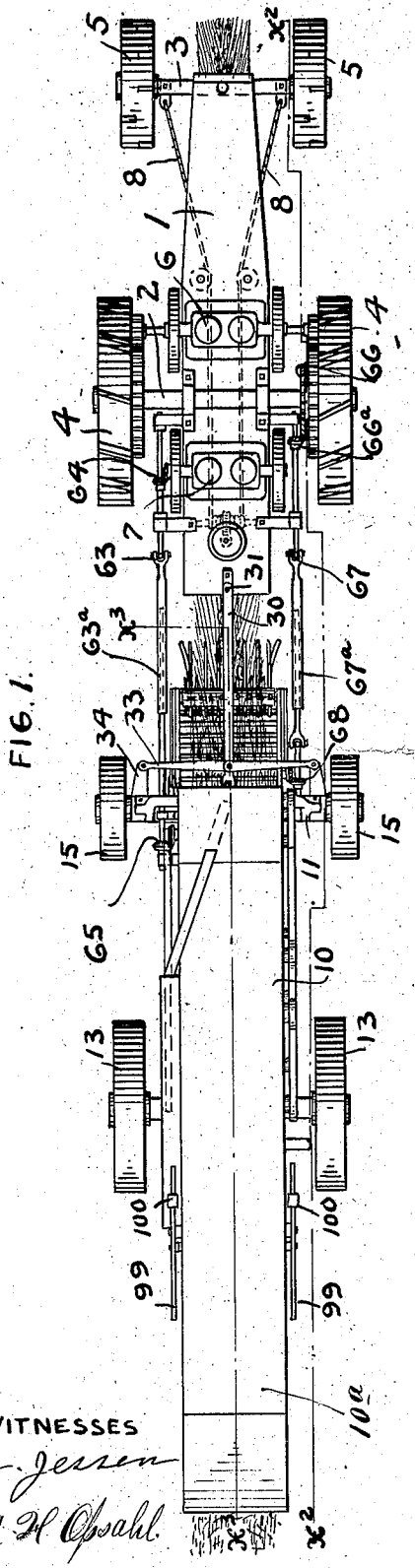
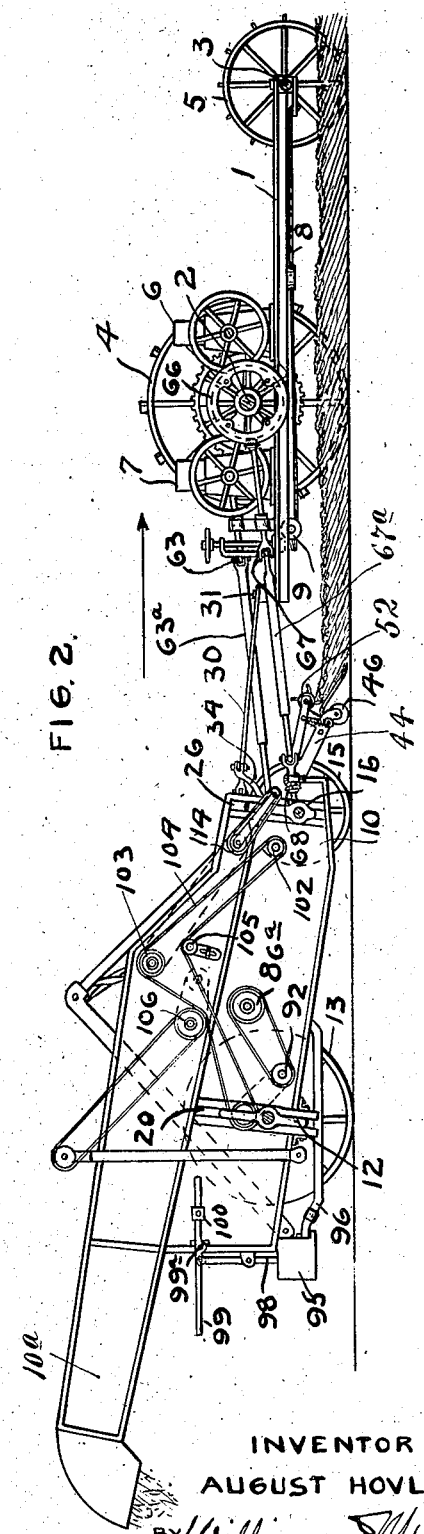
WITNESSES
J. Jessen
A. H. Opsahl
INVENTOR
AUGUST HOVLAND
BY Williamson Merchant
ATTORNEYS.

No. 894,439.
A. HOVLAND.
TRAVELING THRESHER.
APPLICATION FILED FEB. 25, 1907.
PATENTED JULY 28, 1908.
5 SHEETS—SHEET 2.
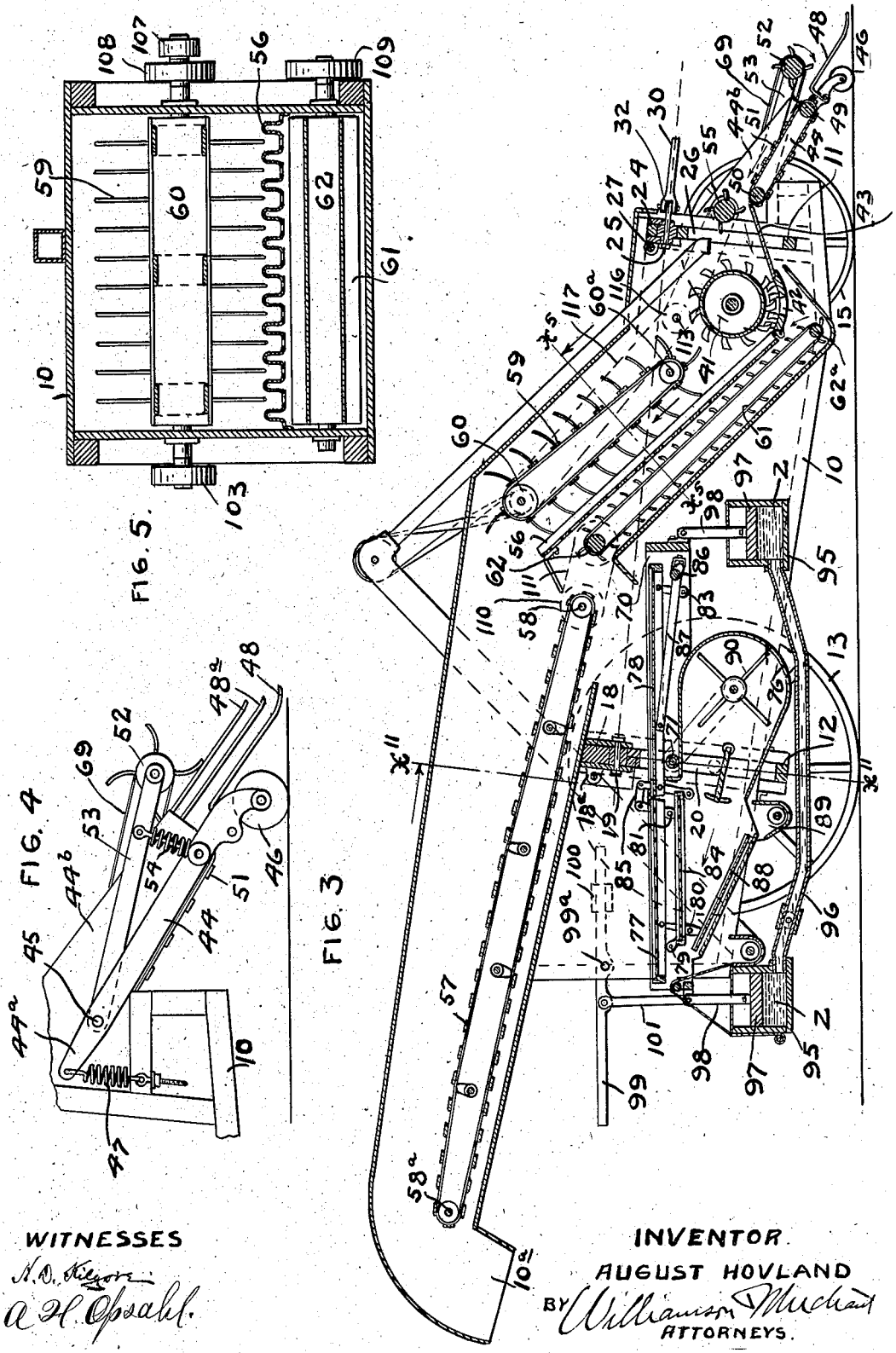
WITNESSES
INVENTOR
AUGUST HOVLAND
BY
ATTORNEYS.

No. 894,439.
PATENTED JULY 28, 1908.
A. HOVLAND.
TRAVELING THRESHER.
APPLICATION FILED FEB. 25, 1907.
5 SHEETS—SHEET 3.
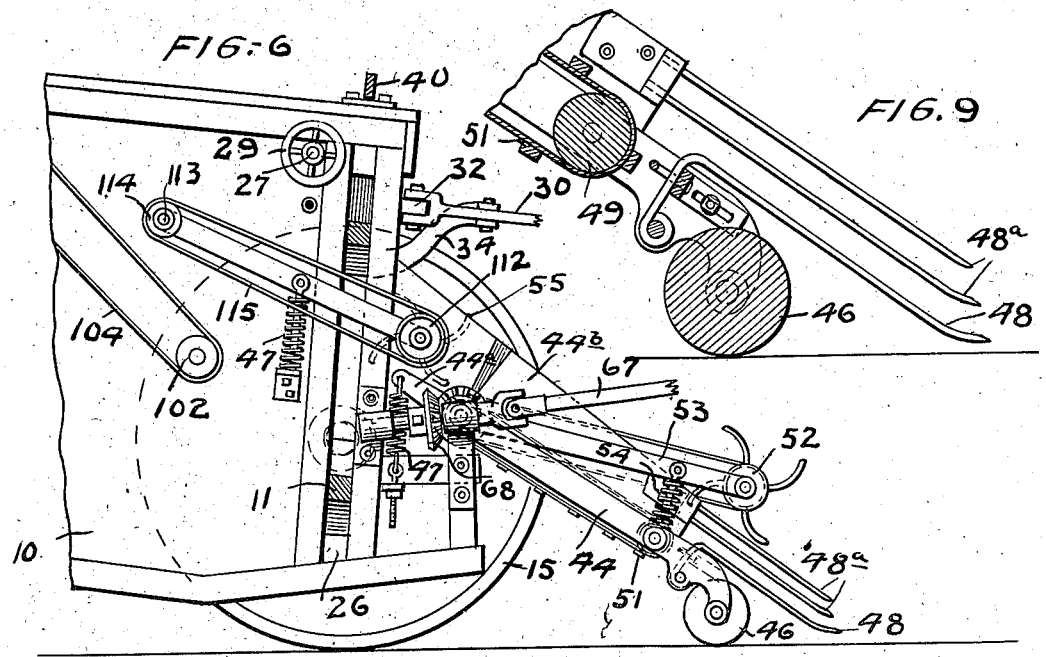
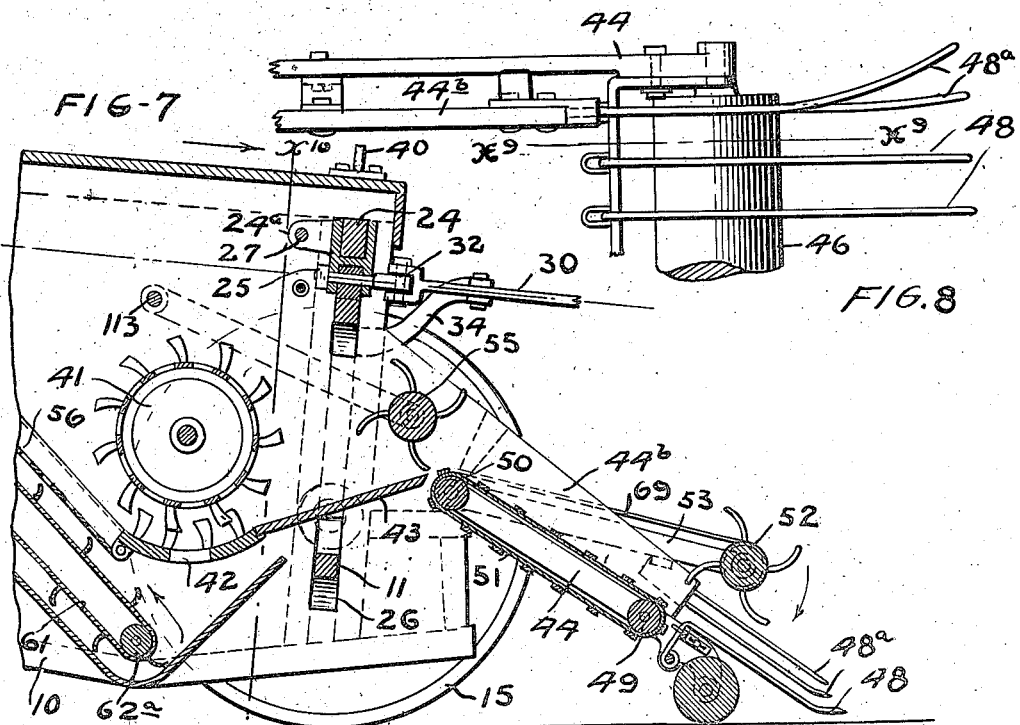
WITNESSES
J. Jessen
A. H. Opsahl
INVENTOR
AUGUST HOVLAND
BY Williamson Merchant
ATTORNEYS

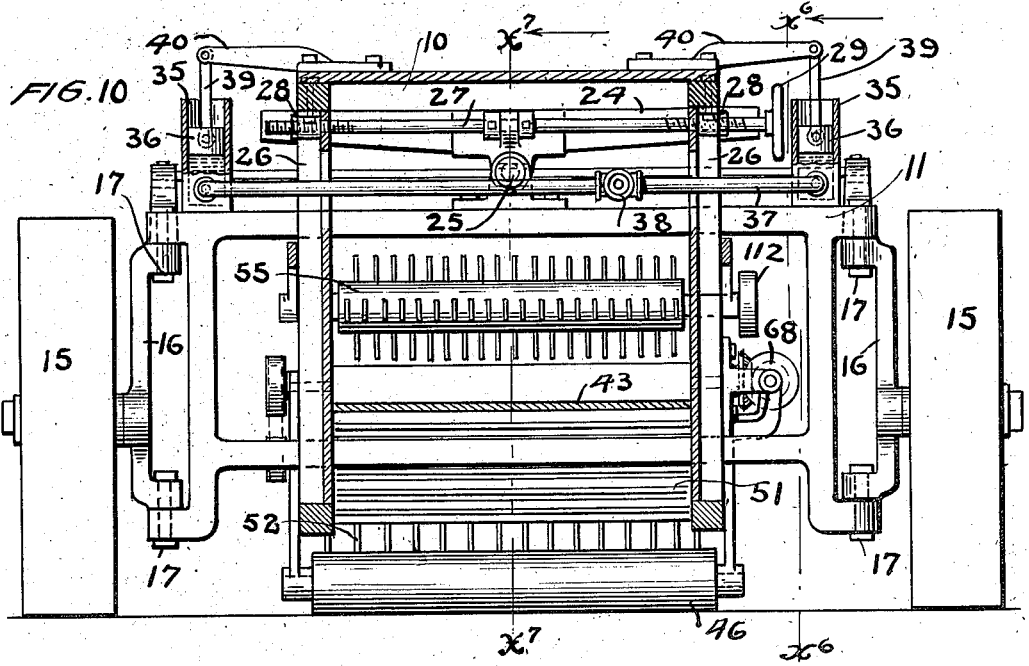
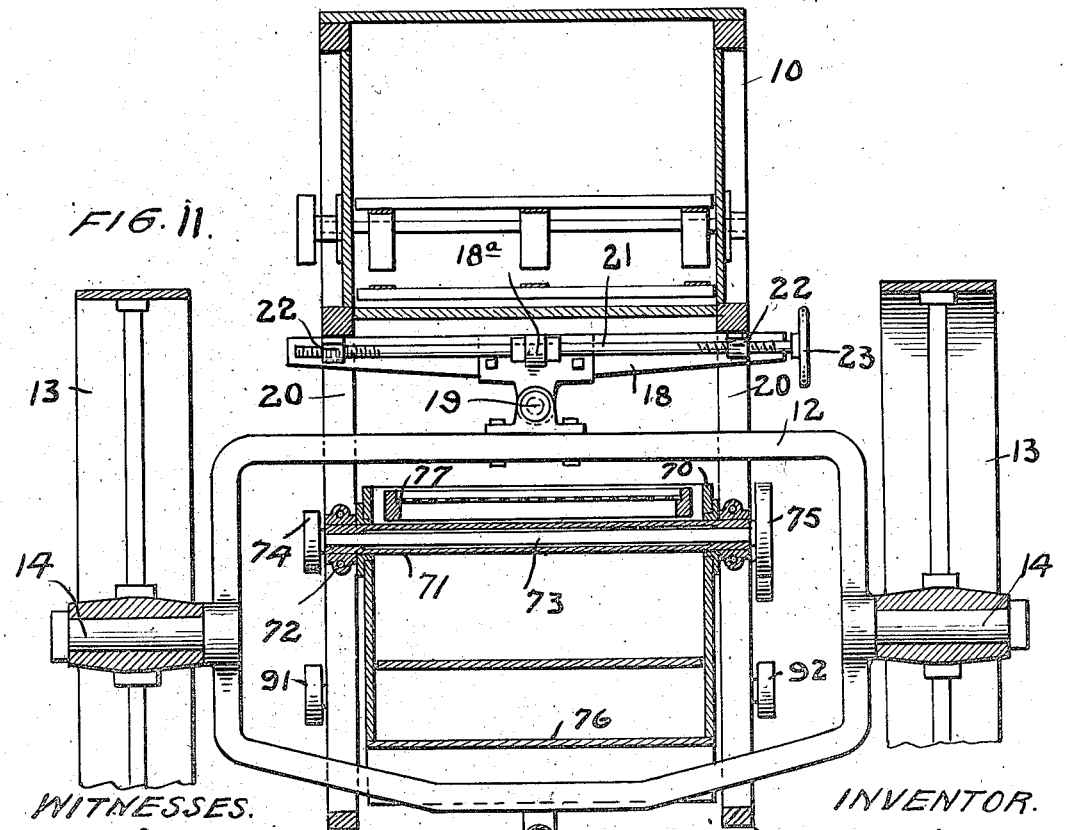

No. 894,439.
A. HOVLAND.
TRAVELING THRESHER.
APPLICATION FILED FEB. 25, 1907.
PATENTED JULY 28, 1908.
5 SHEETS—SHEET 5.
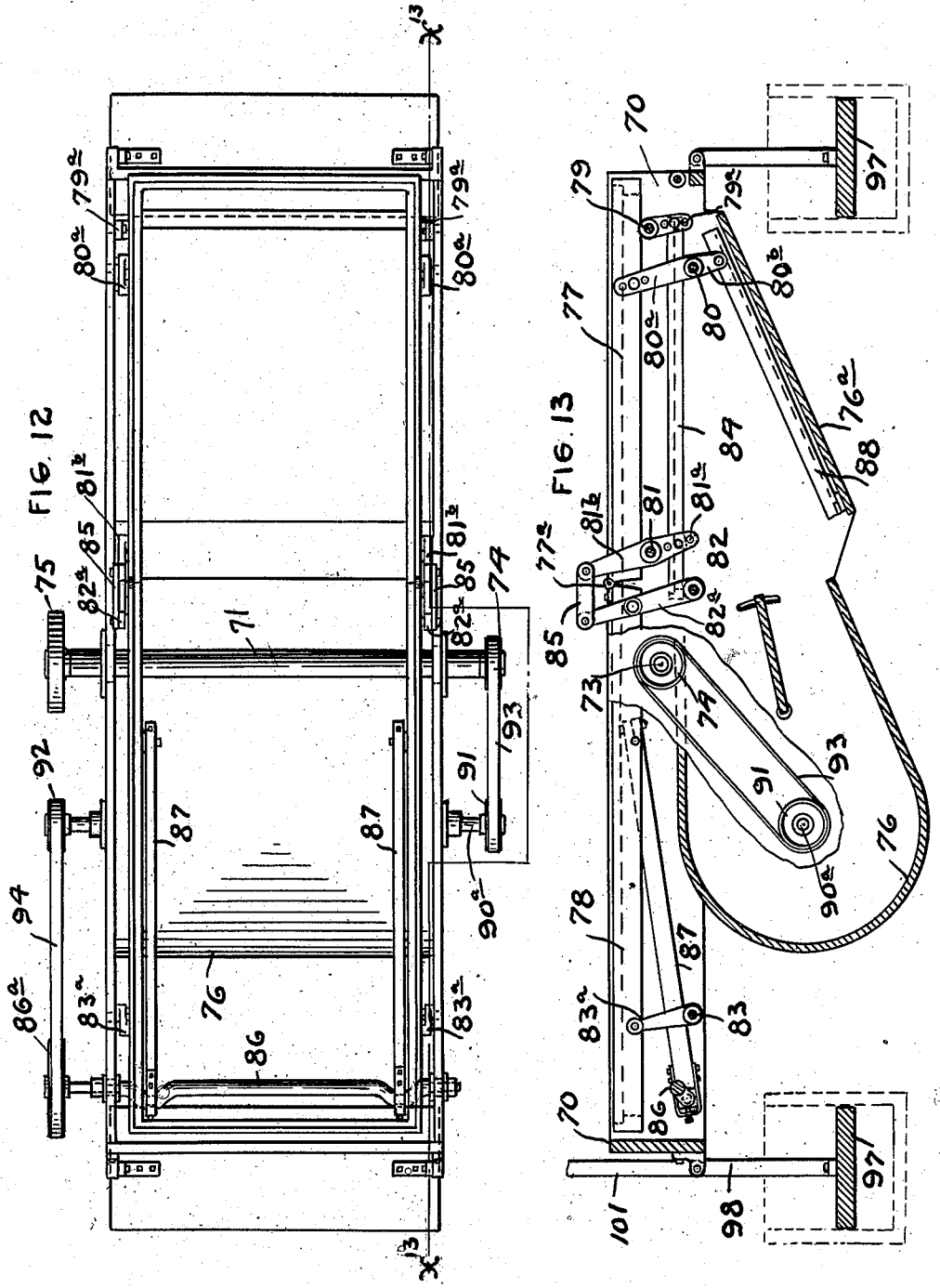
WITNESSES
INVENTOR
AUGUST HOVLAND
BY Williamson Merchant
ATTORNEYS.

UNITED STATES PATENT OFFICE.

AUGUST HOVLAND, OF WAUBAY, SOUTH DAKOTA.

TRAVELING THRESHER.

No. 894,439.

Specification of Letters Patent.

Patented July 28, 1908.

Application filed February 25, 1907. Serial No. 359,094.

*To all whom it may concern:*

Be it known that I, AUGUST HOVLAND, a citizen of the United States, residing at Waubay, in the county of Day and State of South Dakota, have invented certain new and useful Improvements in Traveling Threshers; and I do hereby declare the following to be a full, clear, and exact description of the invention, such as will enable others skilled in the art to which it appertains to make and use the same.

My invention relates to traveling threshers, and has for its object to improve the same in the several particulars hereinafter noted.

The invention consists of the novel devices and combinations of devices hereinafter described and defined in the claims.

In a companion application filed of even date herewith, I have disclosed and claimed an improved reaper, which is adapted to cut grain and deposit the same on the ground in a windrow. This improved threshing machine, or threshing rig, while independent of said reaper, is especially adapted for use in conjunction therewith, and is designed to pick up from the ground wheat or other grain deposited in a windrow, and to thresh the same under the forward movement of the machine or threshing rig.

As a means for propelling and driving the mechanism of the threshing machine, a traction engine is provided.

The improved machine or threshing rig is illustrated in the accompanying drawings, wherein like characters indicate like parts throughout the several views.

Referring to the drawings, Figure 1 is a plan view of the improved threshing rig.
Fig. 2 is a vertical section taken on the line $x^2$ $x^2$ of Fig. 1. Fig. 3 is a vertical section taken through the threshing machine proper on the line $x^3$ $x^3$ of Fig. 1. Fig. 4 is a detail view in side elevation, showing the mechanism at the front end of the threshing machine for picking up the grain from the ground. Fig. 5 is a transverse section taken on the line $x^5$ $x^5$ of Fig. 3. Fig. 6 is a detail in longitudinal section taken on the line $x^6$ $x^6$ of Fig. 10, some parts being broken away. Fig. 7 is a similar section on the line $x^7$ $x^7$ of Fig. 10. Fig. 8 is a fragmentary view in plan of certain of the parts shown in Figs. 6 and 7. Fig. 9 is a section taken on the line $x^9$ $x^9$ of Fig. 8. Fig. 10 is a transverse vertical section taken approximately on the line $x^{10}$ $x^{10}$ of Fig. 7. Fig. 11 is a transverse vertical section taken on the irregular line $x^{11}$ $x^{11}$ of Fig. 3. Fig. 12 is a plan view, with some parts removed, showing the balanced supplemental frame of the threshing machine; and Fig. 13 is a vertical section taken on the line $x^{13}$ $x^{13}$ of Fig. 12.

Referring first to the traction engine which, as shown, is arranged to travel ahead of the threshing machine, the numeral 1 indicates the platform frame, the numeral 2 the rear axle, the numeral 3 the pivoted front axle, the numeral 4 the traction wheels on the rear axle, the numeral 5 the wheels on the front axle, and the numeral 6 an explosive engine, the crank shaft of which is suitably geared to the traction wheels.

The numeral 7 indicates a second explosive engine which, as shown, is mounted on the platform 1 and which, through connections hereinafter described, drives the principal parts of the threshing machine.

The numeral 8 indicates steering cables which, at their forward ends, are attached to the end portions of the axle 3, and which, at their rear ends, are subject to a windlass shaft mechanism mounted on the rear portion of the platform 1, and indicated as an entirety by the numeral 9. However, any suitable steering mechanism may be provided, so far as this invention is concerned.

The threshing machine is provided with a transversely balanced case 10, with a front axle 11 in the form of a rectangular frame or yoke, and with a rear axle 12 which is also in the form of an approximately rectangular frame or yoke. The rear wheels 13 are journaled on trunnions 14 of the rear axle frame 12, while the front wheels 15 are journaled on trunnions of axle brackets 16 that are connected to the ends of the front axle frame 11 by vertical pivot joints 17.

A balancing beam 18 is intermediately pivoted at 19 to the upper central portion of the rear axle frame 12. The said rear axle frame 12 and the ends of the balancing beam 18 work in vertical slots 20 formed in the sides of the casing 10, and the rear portion of the said case rests upon and is supported by the ends of the said balancing beam 18.

The numeral 21 indicates an adjusting rod which, at its intermediate portion, is swiveled to a lug 18ᵃ on the central portion of the beam 18. The end portions of this rod 21 are threaded and engage nut blocks 22 secured to the sides of the case 10. At one end, said adjusting rod 21 is provided with a hand wheel 23, by means of which it may be turned, for a purpose which will hereinafter appear.

A second balancing beam 24 similar to the beam 18 is intermediately pivoted at 25 to the central upper portion of the forward axle frame 11. This beam 24 and the said axle frames 11 work in a vertical slot 26 formed in the front ends of the sides of the case 10. An adjusting rod 27 is swiveled at its central portion to a lug 24ª on the central portion of the balancing beam 24, and at its end portions has threaded engagement with nut blocks 28 on the sides of the case 10. These nut blocks are partly shown in Fig. 10, and the arrangement is the same as that of the rod 21 and nut blocks 22. At one end, the rod 27 is provided with a hand wheel 29, by means of which it may be rotated. The front portion of the case 10 rests upon and is supported by the end portions of the balancing beam 24.

The pivotal connections 19 and 25 are above the center of gravity of the case 10 and parts carried thereby, and hence, it is evident that the case when properly balanced will maintain an upright or a vertical position when the axle frames 11 and 12 are oscillated vertically out of true horizontal positions. It is also evident that the said axle frames 11 and 12 are free to oscillate vertically in the slots 26 and 20, respectively, of the case, and that the said slots hold the said axle frames securely against rotation. By the proper rotation of the threaded adjusting rods 21 and 27, the case 10 may be slid laterally on the ends of the balancing beams 18 and 24, so as to set the said case in balance transversely, such adjustment being necessary in order to compensate for the various devices carried by or mounted on the said case.

The threshing machine is shown as connected to the rear portion of the engine platform or frame 1 by a draw bar 30, detachably pivoted to said platform at 31 and detachably coupled (see Figs. 6 and 7) to a lug 32 on the upper central portion of the front axle 11. The rear portion of the draft bar 30 is connected by links 33 to forwardly projecting arms 34 of the axle brackets 16, so that proper steering movements will be imparted to the front wheels 15 of the threshing machine.

To prevent quick vibrations of the machine case 10 transversely of the machine, dash pots 35 and pistons 36 are provided. As shown, the dash pots are secured to the front axle 11 and are connected by a pipe 37 having a valve 38 adapted to be opened more or less to properly restrict the flow of oil or other liquid from the one dash pot to the other. The pistons 36 are connected by links 39 to arms 40 secured to and projecting from the opposite sides of the case 10. These dash pots and pistons prevent a pendulum-like lateral swinging movement of the case 10, and cause the same to maintain a vertical position. Mounted in the extreme forward portion of the case 10, is a threshing cylinder 41 and coöperating toothed concave 42, from the latter of which an inclined deck 43 projects forward.

In front of the deck 43 is a grain pick-up device which preferably comprises several coöperating devices, to-wit; A forwardly inclined frame 44 is pivotally connected by a shaft 45 to the sides of the front of the case 10. The free forwardly projected end of this frame 44 is supported by a ground engaging roller 46 and its weight is partly sustained by a spring 47 that connects a rearwardly extended arm 44ª of said frame to a fixed part of the case 10, as best shown in Fig. 4.

The numeral 48 indicates a grain pick-up fork secured to the front end of the frame 44, and 48ª indicates side tines, shown as secured to the side boards 44ᵇ of said frame 44. The fork 48 is preferably adjustable to different heights, and the tines thereof are preferably yieldingly supported for independent upward pivotal movements in passing over an obstruction.

The frame 44 carries a pair of rollers 49 and 50, the shaft 45 of the latter of which is at the pivotal connection of said frame to the case 10. An endless conveyer belt or slatted canvas 51 runs over the rollers 49 and 50 and serves to carry the grain from the fork 48 to the deck 43.

A toothed roller 52 overlies the fork 48 and is supported by a pair of arms 53 pivoted on the shaft 45. Spring devices 54 yieldingly support the arms 53 from the pivoted frame 44, as best shown in Figs. 4 and 6. Another toothed roller 55 overlies the receiving end of the deck 43, and the shaft thereof is journaled in the sides of the case 10.

A channel shaped grate 56 inclines upward and rearward from the threshing concave 42, and delivers onto a straw rattle or conveyer 57 of the usual or any suitable type. This rattle or conveyer runs over suitable rollers 58, 58ª, mounted in the sides of a stack forming section 10ª of the case 10. A toothed endless elevator belt 59 works over the inclined grate 56 and runs over rollers 60, 60ª, journaled in the sides of the case 10. The numeral 61 indicates a slatted endless apron, that runs over rollers 62—62ª journaled in the sides of the case 10.

The threshing cylinder 41 is driven from the engine 7 through a knuckle jointed shaft 63 having a telescopically adjustable intermediate section 63ª. One end section of this shaft 63 is connected to the crank shaft of the engine 7 by miter gears 64, and the other end section of said shaft is connected to the shaft of said threshing cylinder by miter gears 65.

The conveyer belt or apron 51 on the pivoted frame 44 of the grain pick-up device is driven from a bevel gear 66 carried by one of the traction wheels 4 of the traction engine, through a knuckle-jointed shaft 67 having a telescopically adjustable intermediate section 67ᵃ. The front end section of the shaft 63 is connected to the gear 66 by a bevel pinion 66ᵃ, and the rear end section of said shaft is connected to the shaft of the roller 50 by a pair of miter gears 68. The toothed roller 52 is driven from the roller 50 through a belt 69. By this arrangement, just described, the so-called pick-up belt or apron 44 and toothed roller 52 will be driven at a speed depending on the advanced speed of the threshing machine and traction engine. The straw will, of course, be carried upward over the grate 56 by the toothed conveyer 59. The grain dropped through the grate and through the concave 42 will be elevated by the conveyer 61 and will be delivered onto the receiving member, such as the grain pan, of the separating mechanism proper, or, otherwise stated, the vibratory sieve mechanism. In accordance with one of the important features of my present invention, I mount these vibratory sieves or screens and preferably also certain other coöperating parts, such as the grain pan and fan, on a supporting frame which is balanced and held level in a direction transversely of the machine by the transversely balanced machine case 10, and in a direction longitudinally of the machine, it is held level by an automatic leveling device of novel construction. This balanced frame 70 is shown as rectangular in form, and at its central portion is pivotally mounted on a heavy transversely extended bearing sleeve 71, the ends of which are secured in bearing boxes 72 (see Fig. 11), rigidly secured in the slots 20 and to the sides of the case 10. A counter-shaft 73 extends through the sleeve 71 and at one end is provided with a pulley 74, and at its other end with a pulley 75. The frame 70 supports a depending fan case 76 and inclined deck 76ᵃ.

The numeral 77 indicates a chafing sieve, and the numeral 78 indicates the usual grain pan connected thereto by a hinge 77ᵃ. In the sides of the frame 70 are mounted five transversely extended rock shafts 79, 80, 81, 82 and 83. The shaft 80 has upwardly extended arms 80ᵃ that are pivotally connected to the sieve 77. The shafts 82 and 83 are provided with arms 82ᵃ and 83ᵃ, respectively, that are pivotally connected to the grain pan 78. The rock shafts 79 and 81 are provided with depending arms 79ᵃ and 81ᵃ, that support a vibratory grain sieve 84. The rock shaft 81 is also provided with an upwardly extended arm 81ᵇ that is connected to the upper end of one of the arms 82ᵃ by a short link 85. These connections cause the pan 78 and chafing sieve 77 to move simultaneously in the same direction, and the sieve 84 to move simultaneously in directions reverse to the movement thereof. In one end of the frame 70 is journaled a crank shaft 86 that is connected by a pair of pitmen 87 to the sides of the grain pan 78. The rock shaft 80 is provided with short arms 80ᵇ that support the upper end of a vibratory inclined deck 88, the lower end of which rides upon the deck 76ᵃ. This deck 88 delivers the cleaned grain into the usual auger-equipped spout 89.

Working in the fan case 76 is a fan head 90, the shaft 90ᵃ of which is provided at one end with a pulley 91, and at its other end with a pulley 92. A belt 93 runs over the pulleys 74 and 91 to transmit motion from the shaft 73 to the fan shaft 90ᵃ, and a belt 94 runs over the pulley 92 and over a pulley 86ᵃ on the crank shaft 86, to impart motion to the latter.

Rigidly secured to the sides of the case 10, one below each end of the pivoted frame 70, is a pair of elongated dash pots or boxes that extend preferably from one side to the other of said case. These dash pots or boxes 95 are connected by a pipe 96 preferably having a valve adapted to be opened and closed to any desired extent. Working within the dash pots 95 are piston acting floats 97 which, by links 98, are connected to the ends of the pivoted frame 70. The dash pots or boxes 95 are preferably made large, so that they are adapted to contain a very considerable amount of oil, water or other liquid, indicated by the character z.

I provide means for counterbalancing the frame 70 and parts carried thereby so that the dash pots and pistons operated upon by the liquid z and under gravity, may maintain the sieves which are carried by the frame 70 in horizontal or predetermined approximately horizontal positions. This counterbalancing device, as shown, comprises a pair of levers 99 that are pivoted at 99ᵃ to the sides of the case 10 and are provided with adjustable links 100 adapted to be applied to either end thereof. Links 101 connect said levers 99 to the rear end of the frame 70. Of the other driving connections of the machine, it is only desirable to note as follows: On the right hand end of the cylinder shaft (see Fig. 2) is a pulley 102, and on the right hand end of the shaft of the roller 60 is a pulley 103. The numeral 104 indicates a belt which runs over the pulleys 102, 103, 75, over an idle guide pulley 105 and over a pulley 106 on the shaft of the roller 58. On its left hand end, the shaft of the roller 60 is provided with two pulleys 107 and 108, and on its left hand end the shaft of the roller 62 is provided with a pulley 109. On the left hand end of the shaft of the roller 58 is a pulley 110 over which and the pulley 109 runs a short belt 111 (see dotted lines Fig. 3). On the right hand end of the shaft of the toothed feed roller 55 (see Fig. 6) is a pulley 112. The numeral 113 indicates a countershaft journaled in the sides of the case 10 and provided at its right hand end with a pulley 114 over which and the pulley 112 runs a belt 115. On the left hand end of the countershaft 113 is a pulley 116 over which and the pulley 108 of the roller 60 runs a belt 117 (see dotted lines in Fig. 3). The pulley 107 serves to drive one of the grain elevators of the machine, the construction and arrangement of which it is not necessary to consider for the purposes of this case.

As already described, the case 10 and parts carried thereby will be counterpoised or balanced so that the said case will stand in an upright position under the action of gravity, oscillatory movement thereto being on the pivotal connections 19 and 25.

The importance of maintaining the sieves 77–84 and pan 78 in an approximately horizontal or predetermined position is well known by all persons familiar with the use of this class of machines. For different kinds of work, a slight inclination thereof longitudinally of the machine is desired, but the inclination having been determined, it is desirable to maintain the same with respect to a horizontal, regardless of whether the machine is traveling up hill or down hill. The predetermined adjustment of the said sieves and pan, and, hence, of course, of the pivoted frame 70, is regulated by the adjustment of the weights 100 on the counterbalancing arms 99. In running down hill, the water $z$ will run from the rear dash pot 95 into the front dash pot 95 and will raise the front float 97 so as to thereby maintain the predetermined position of the frame 70, sieves and pan carried thereby. In running up hill, the water will run from the forward dash pot 95 into the rear dash pot 95 and will raise the rear float 97 and thereby maintain the predetermined position of said frame 70 and parts carried thereby.

The wheels of the traction engine, as well as the wheels of the threshing machine are, as is evident, arranged to straddle or run on opposite sides of the windrow of grain which is being picked up and threshed by the machine. The loose grain of the windrow, in the first instance, is, under the advance movement of the machine, picked up and raised in the first instance by the fork 48, and when slightly raised is taken up by the endless conveyer belt 51 and is fed to the threshing cylinder and concave, its upward movement being further facilitated by the action thereof of the toothed overhead rollers 52 and 55. The grain dropped through the concave is carried upward by the conveyer belt 61 and is delivered into the grain pan 78, while the straw is carried upward over the grate 56 by the toothed conveyer belt 59 and from thence is delivered onto the endless straw rack 57, by which latter it is discharged at the delivery end of the stack 10$^a$. The extensible knuckle jointed shafts 63 and 67, of course, permit the required pivotal movements of the traction engine with respect to the threshing machine. It is important to note that the belt 51 and toothed roller 52 of the grain pick-up device is driven from one of the traction wheels and the traction engine, and, hence, will always be driven at a speed which is in proportion to the advance speed of the threshing rig. The frame 44 of the pick up device is, of course, free for vertical movements to adapt itself to irregularities in the ground. The toothed roller 52 is supported by the springs 54 in such manner that it may freely rise and fall to adapt itself to the thickness of the grain which is being fed upward from the fork 48 to the belt 51.

From the forgoing description it is thought to be evident that by the use of a threshing rig of the character above described, grain loosely deposited in windrows may be picked up and threshed in a highly efficient manner So far as the broad idea of this invention is concerned, it will be understood that the threshing machine may be driven by any suitable power, either mechanical or animal power.

What I claim is:

1. In a traveling thresher, the combination with a main frame, of a supplemental frame pivotally mounted on said main frame, and a hydraulic leveling device constituting an automatically adjustable connection between said main frame and supplemental frame, substantially as described.

2. In a traveling thresher, the combination with a pivotally adjustable sieve-equipped frame, of a hydraulic leveling device comprising dash pots and floats connected to said frame, substantially as described.

3. In a traveling thresher, the combination with a pivotally adjustable sieve-equipped frame, of a hydraulic leveling device comprising a pair of dash pots, a conduit connecting the same, and floats working in said dash pots and connected to said frame on opposite sides of its pivotal support, substantially as described.

4. In a traveling thresher, the combination with a sieve-equipped frame intermediately mounted on a transverse pivot, of a hydraulic leveling device comprising dash pots located one in front and the other in the rear of the pivotal support of said frame, a conduit connecting said dash pots, and floats working in said dash pots and connected one to the front and the other to the rear end of said frame, substantially as described.

5. In a traveling thresher, the combination with a sieve-equipped frame intermediately mounted on a transverse pivot, a fan supported by said frame and arranged to deliver a blast of air to said sieves, driving connections to said fan, and a hydraulic leveling device comprising dash pots, one at the front and the other at the rear of the pivotal support of said frame, a conduit connecting said dash pots, and floats in said dash pots connected one at the front and the other at the rear end of said adjustable frame, substantially as described.

6. In a traveling thresher, the combination with a suitable truck, of a main frame or casing gravitally suspended from said truck and free for swinging movements transversely thereof, and threshing mechanism supported by said main frame or casing and including a sieve-equipped frame and gravity actuated means for maintaining said sieve-equipped frame in a predetermined position in respect to a horizontal line extending longitudinally of the machine, substantially as described.

In testimony whereof I affix my signature in presence of two witnesses.

AUGUST HOVLAND.

Witnesses:
MALIE HOEL,
F. D. MERCHANT.